(12) United States Patent
Ramesh et al.

(10) Patent No.: US 7,375,174 B2
(45) Date of Patent: May 20, 2008

(54) ACRYLIC COMPOSITION AND A CURABLE COATING COMPOSITION INCLUDING THE SAME

(75) Inventors: Swaminathan Ramesh, Canton, MI (US); Marvin L. Green, Brighton, MI (US)

(73) Assignee: BASF Corporation, Southfield, MI (US)

( * ) Notice: Subject to any disclaimer, the term of this patent is extended or adjusted under 35 U.S.C. 154(b) by 246 days.

(21) Appl. No.: 11/088,217

(22) Filed: Mar. 23, 2005

(65) Prior Publication Data

US 2005/0197473 A1    Sep. 8, 2005

Related U.S. Application Data

(63) Continuation-in-part of application No. 10/793,528, filed on Mar. 4, 2004, now Pat. No. 7,144,966, and a continuation-in-part of application No. 10/861,061, filed on Jun. 4, 2004.

(51) Int. Cl.
*C08F 8/00* (2006.01)
*C08F 118/02* (2006.01)

(52) U.S. Cl. ............ 526/319; 526/346; 526/347; 526/230; 526/303.1; 526/341

(58) Field of Classification Search ............... 526/319, 526/346, 347, 230, 303.1, 341
See application file for complete search history.

(56) References Cited

U.S. PATENT DOCUMENTS 5,763,548 A     6/1998 Matyjaszewski et al. ... 526/135
5,907,024 A     5/1999 Ohrbom et al.
6,462,144 B1 *  10/2002 Ramesh et al. ............ 525/438
7,052,816 B2    5/2006 Qian et al.

FOREIGN PATENT DOCUMENTS

WO    WO96/30421    3/1996
WO    WO00/12566    9/2000
WO    WO00/12567    9/2000

OTHER PUBLICATIONS

Australian Publication, entitled "Facile Synthesis of Comb, Star, and Graft Polymers Via Reversible Addition—Fragmentation Chain Transfer (RAFT) Polymerization", May 01, 2002, pp. 2956-2966.
Macromolecules Publication, entitled "Accurate Control of Chain Ends by a Novel Living Free-Radical Polymerization Process", 1995, pp. 2993-2995.

* cited by examiner

*Primary Examiner*—Robert D. Harlan

(57) ABSTRACT

An acrylic composition includes the reaction product of an acrylic polymer, a carboxylic acid compound, and an alkyl carbamate. The acrylic polymer includes the reaction product of a functionalized monomer, a first compound reactive with the functionalized monomer to form a functionalized intermediate, and a highly branched, polyfunctional core molecule reactive with the functionalized intermediate. The first compound includes vinyl functionality reactive with the functionalized monomer and epoxy functionality. The carboxylic acid compound has carboxylic acid functionality that is reactive with the acrylic polymer. The alkyl carbamate is reactive with the hydroxyl-functional acrylic polymer to form the acrylic composition. The acrylic composition is highly-branched and, when used in coating compositions in combination with a suitable cross-linking agent, enhances recoat adhesion and produces cured films that have optimum scratch, mar, and chip performance, and acid etch resistance.

28 Claims, No Drawings

ACRYLIC COMPOSITION AND A CURABLE COATING COMPOSITION INCLUDING THE SAME

CROSS REFERENCE TO RELATED APPLICATION

This application is a continuation-in-part of U.S. patent application Ser. Nos. 10/793,528 now U.S. Pat. No. 7,144,966 and 10/861,061, which were filed on Mar. 4, 2004 and Jun. 4, 2004, respectively.

BACKGROUND OF THE INVENTION

1. Field of the Invention

The present invention generally relates to an acrylic composition. More particularly, the present invention relates to an acrylic composition that can be incorporated into a curable coating composition and then used in coating applications, such as an automotive coating application, to produce films that have suitable scratch, mar, and chip performance.

2. Description of the Related Art

Acrylic compositions and their use in a wide variety of coating applications are known in the art. In a curable coating composition, acrylic compositions, along with a suitable cross-linking agent, generally produce a film having good film properties, such as resistance to scratch, mar, and chip. Curable coating compositions that utilize acrylic compositions typically require solvents to dissolve or otherwise reduce the acrylic composition for processing and application purposes. Solvents are required primarily due to a high molecular weight and a correspondingly high viscosity for the acrylic composition.

Although the conventional acrylic compositions are generally inexpensive to prepare, these particular compositions with large proportions of non-functional alkyl acrylic monomers provide poor recoat adhesion due to the formation of pendant and non-functional acrylic chains during cure. These acrylic chains migrate toward an upper surface of a cured film of a coating composition having the conventional acrylic composition and inhibit the adhesion of coating compositions that are subsequently applied to the cured film. It is also known in the art that other properties of the cured film, including scratch and mar resistance, may be compromised when the coating composition includes the conventional acrylic composition due to the formation of the acrylic chains described above. Furthermore, the conventional acrylic compositions that do not include carbamate functionality for subsequent cross-linking with aminoplasts exhibit poor resistance to acid etch. As a result, cured film formed from the conventional acrylic compositions is susceptible to damage due to acid rain.

It is known that there is a movement toward utilizing acrylic compositions that have lower molecular weights so as to reduce the overall amount of solvents, i.e., volatile organic compounds (VOCs), required in the coating composition. However, it is also known that coating compositions that utilize conventional acrylic compositions with lower molecular weights produce films that have poorer film properties as evidenced by decreased scratch, mar, and chip performance.

Highly branched, e.g. star, compositions are being utilized more frequently because they offer higher molecular weights yet they exhibit low viscosity, as compared to the viscosity of conventional acrylic compositions, i.e., acrylic compositions that are not highly branched. These highly branched compositions have, to date, primarily been polyester-based. However, some highly branched acrylic compositions have been developed by complex methods such as Atom Transfer Radical Polymerization (ATRP) and Reversible Addition-Fragmentation Chain Transfer (RAFT) Polymerization. These methods are complex, and are therefore generally undesirable for a variety of reasons including, but not limited to, slow reaction times, poor manufacturability, use of metal or sulfur-containing compounds, and a requirement for post purification of the acrylic composition.

Due to the inadequacies associated with the acrylic polymers of the prior art, especially the highly branched acrylic compositions developed by ATRP and RAFT, it is desirable to provide a novel acrylic composition that is economical and highly-branched. It is also advantageous to provide an acrylic composition, and a curable coating composition including the acrylic composition, that promotes acid etch resistance, enhances recoat adhesion, and is optimized for cross-linking when used in coating compositions.

SUMMARY OF THE INVENTION AND ADVANTAGES

The subject invention provides an acrylic composition and a curable coating composition including the acrylic composition. The acrylic composition includes an acrylic polymer. The acrylic polymer includes the reaction product of a functionalized monomer, a first compound reactive with the functionalized monomer to form a functionalized intermediate, and a highly branched, polyfunctional core molecule reactive with the functionalized intermediate to form the acrylic polymer. The first compound includes vinyl functionality reactive with the functionalized monomer and epoxy functionality. The acrylic polymer is highly-branched and cost-effective, as compared to conventional acrylic polymers that are highly-branched.

The acrylic composition further includes a carboxylic acid compound including carboxylic acid functionality and an alkyl carbamate. The carboxylic acid compound is reactive with the epoxy functionality of the acrylic polymer to form a hydroxyl-functional acrylic polymer. The alkyl carbamate is reactive with the hydroxyl-functional acrylic polymer. Thus, the final acrylic composition includes carbamate functionality.

The curable coating composition includes the acrylic composition and a cross-linking agent that is reactive with the carbamate functionality of the acrylic composition. When used in the curable coating composition, in combination with the cross-linking agent, the acrylic composition produces films, especially clearcoat films, that have optimum scratch, mar, and chip performance, and acid etch resistance. Furthermore, the acrylic compositions enhance recoat adhesion.

DETAILED DESCRIPTION OF THE PREFERRED EMBODIMENT

The acrylic composition of the present invention is preferably used in curable coating compositions and cured film to improve certain properties of the cured film including, but not limited to, acid etch resistance and recoat adhesion. More specifically, the acrylic composition has carbamate functionality and, optionally, hydroxyl functionality that may be cross-linked with a cross-linking agent in the curable coating compositions. As referred to herein, the acrylic composition may include the reaction product of the acrylic polymer, a carboxylic acid compound, and an alkyl carbamate, after reaction of those components. The final acrylic composition formed after the reaction of the aforementioned components includes carbamate functionality. Alternatively, the acrylic composition may include the acrylic polymer, carboxylic acid compound, and/or alkyl carbamate unreacted. That is, the acrylic composition may include the acrylic polymer and the carboxylic acid compound, the acrylic polymer and the alkyl carbamate, or the acrylic polymer, carboxylic acid compound, and alkyl carbamate prior to reaction between those components.

The acrylic polymer is also referred to in the art as a star acrylic polymer or a star polymer having a core and a plurality of functionalized acrylate branches (also referred to as chains, arms, appendages, and the like). Preferably, the acrylic polymer is formed via a free-radical, acrylic polymerization method that is described additionally below. More specifically, the acrylic polymer is the reaction product of a functionalized monomer, a first compound that is reactive with the functionalized monomer to form a functionalized intermediate, and a highly-branched, polyfunctional core molecule reactive with the functionalized intermediate to form the acrylic polymer. The first compound includes vinyl functionality that is reactive with the monomer. The first compound also includes epoxy functionality that remains unreacted in the acrylic polymer. The highly-branched, polyfunctional core molecule, hereinafter simply referred to as the core molecule, functions as the core of the acrylic polymer. The first compound and the core molecule are described additionally below.

In one embodiment, the functionalized monomer, hereinafter simply referred to as the monomer, includes hydroxyl-reactive functionality and vinyl functionality. The descriptive terminology 'functionalized' that precedes the monomers refers to any functionality that can react with the functionality from the core molecule.

The vinyl functionality of the monomer is suitable for stopping chain growth during the free-radical, acrylic polymerization of the monomer and the first compound. Preferably, the hydroxyl-reactive functionality remains unreacted in the functionalized intermediate, after the polymerization between the monomer and the first compound, and is reactive with the hydroxyl functionality present on the core molecule. For example, the monomer may include an aliphatic isocyanato functionality, which is reactive with hydroxyl functionality and may also be referred to as isocyanate functionality, if the core molecule includes a polyol, which has hydroxyl functionality. One such most preferred monomer is α,α-dimethyl isopropenyl benzyl isocyanate, which has both vinyl functionality and aliphatic isocyanato functionality as the hydroxyl-reactive functionality. α,α-dimethyl isopropenyl benzyl isocyanate is also known in the art as TMI® (Meta) Unsaturated Aliphatic Isocyanate and is commercially available from Cytec Industries. α,α-dimethyl isopropenyl benzyl isocyanate is also referred to in the art as 3-isopropenyl-α,α-dimethylbenzyl isocyanate, and α,α-dimethyl meta-isopropenyl benzyl isocyanate. Furthermore, although less preferred, the ortho and para forms of α,α-dimethyl isopropenyl benzyl isocyanate are also feasible. The α,α-dimethyl isopropenyl benzyl isocyanate has the chain-stopping effect of limiting the number of —NCO functionalities under normal acrylic polymerization conditions. For descriptive purposes, a chemical representation of α,α-dimethyl isopropenyl benzyl isocyanate is disclosed below.

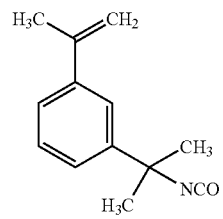

Other suitable examples of hydroxyl-reactive functionality of the monomer may include cyano functionality, carboxylic acid halide functionality, melamine functionality, and combinations thereof. In other embodiments, the hydroxyl-reactive functionality may be replaced with hydroxyl functionality. It is to be appreciated that when the hydroxyl functionality replaces the hydroxyl-reactive functionality, the core molecule has hydroxyl-reactive functionality that will react with the hydroxyl functionality of the monomer. One such preferred monomer is modified TMI that has had the isocyanato functionality replaced by methylol functionality.

Other monomers are suitable for the acrylic composition so long as the monomers are functionalized for subsequent reaction with the core molecule and either have the ability to stop chain growth during the free-radical, acrylic polymerization or have the ability to dissociate for initiating the free-radical, acrylic polymerization with the first compound. Examples of other suitable monomers that have the ability to stop chain growth include, but are not limited to, functionalized styrene (preferably with substituents on the 2 and 6 positions), functionalized vinyltoluene, functionalized α-methylstyrene, functionalized diphenylethylene, functionalized dinapthalenethylene, and combinations thereof. In any event, the monomer is preferably present in the acrylic polymer in an amount of from 1 to 20, more preferably from 3 to 10, parts by weight based on the total weight of the acrylic polymer.

When the monomer including the vinyl functionality is used, an initiator is used to initiate the free-radical, acrylic polymerization between the monomer and the first compound. As understood by those skilled in the art, a wide variety of initiators may be used. However, it is preferred that the initiator is selected from the group of inorganic persulfates such as ammonium persulfate, $(NH_4)_2S_2O_8$, potassium persulfate, $K_2S_2O_8$, and sodium persulfate, $Na_2S_2O_8$, dialkyl peroxides such as di-tert-butyl peroxide and dicumyl peroxide, hydroperoxides such as cumene hydroperoxide and tert-butyl hydroperoxide, peresters such as tert-butyl peroctoate (TBPO), which is also known as tert-butyl peroxy-2-ethylhexanoate, tert-butyl perbenzoate, tert-butyl perpivalate, tert-butyl per-3,4,5,-trimethylhexanoate and tert-butyl per-2-ethylhexanoate, azo compounds, and combinations thereof. Suitable azo compounds include, but are not limited to, Vazo® 52, 64, 67 and the like. Vazo® 52, 64, 67 are, respectively, 2,2'-azobis(2,4-dimethylpentanenitrile), 2,2'-azobis(2-methylpropanenitrile), and 2,2'-azobis(2-methylbutanenitrile). Inorganic peroxodisulfates and ammonium or alkali metal peroxydiphosphates can also be utilized to initiate the free-radical, acrylic polymerization method. Most preferably, the initiator is tert-butyl peroctoate.

In another embodiment, the monomer includes a radical-forming portion instead of the vinyl functionality. The term "radical-forming portion" is defined as any portion of the monomer that is dissociated in the presence of a catalyst, upon the application of heat, or through any other known method for dissociating the monomer. In addition, the monomer includes a functionality that may be hydroxyl functional or hydroxyl-reactive functionality, depending on the functionality of the core molecule that is used. After dissociation of the monomer, the radical-forming portion of the monomer has a free radical.

Preferably, the monomer includes the radical-forming portion, which preferably includes a peroxide, and hydroxyl functionality. The hydroxyl functionality can react with the core molecule that includes hydroxyl-reactive functionality. One such preferred monomer is Cyclonox® E, which is commercially available from Akzo-Nobel. Cyclonox® E is di-(1-hydroxycyclohexyl) peroxide, which is of the formula:

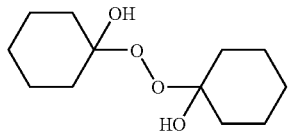

Dissociation of the di-(1-hydroxycyclohexyl) peroxide results in the oxygen-oxygen bond breaking, leaving two radicalized compounds that each have the free radical on the oxygen atom that was part of the oxygen-oxygen bond prior to dissociation, as shown by the following formula:

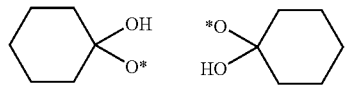

where "*" indicates the free radical.

Other monomers that include the radical-forming portion and the hydroxy functionality are also suitable. Examples of such other monomers include, but are not limited to, VA-085 and VA-086, which may be characterized as azo compounds having hydroxyl functionality. VA-085 is of the formula:

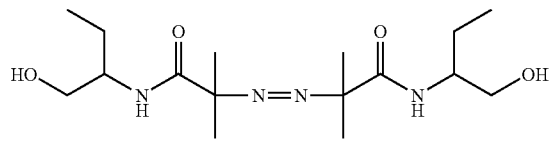

and VA-086 is of the formula:

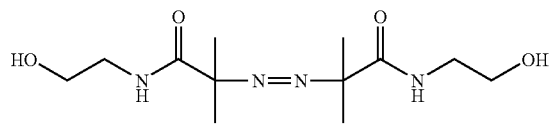

In other embodiments, instead of the hydroxyl functionality, the monomer may include hydroxyl-reactive functionality and the radical forming portion. The hydroxyl-reactive functionality may react with the core molecule that includes hydroxyl functionality. One such suitable monomer may be formed from Vazo 67 by converting the cyano functionality to amino or amido functionality. The amino or amido functionality can then be reacted with an isocyanato or aminoplast, respectively.

As previously stated, the first compound is reactive with the monomer to form the functionalized intermediate. When the monomer including the vinyl functionality is used, the first compound is reactive with the vinyl functionality after the initiator initiates the free-radical, acrylic polymerization. When the monomer including the radical forming portion is used, the first compound is reactive with the radical-forming portion of the monomer. More specifically, it is the vinyl functionality of the first compound that is reactive with either the vinyl functionality of the monomer after initiation or the free radical portion of the monomer after dissociation, depending on the monomer used.

The first compound having the vinyl functionality and the epoxy functionality may be any epoxy functional acrylate or methacrylate. Preferably, the first compound is selected from the group of glycidyl acrylate, glycidyl alkacrylates, and combinations thereof. For descriptive purposes, a chemical representation of glycidyl methacrylate is disclosed below.

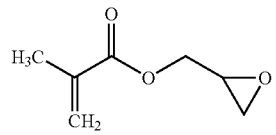

As stated above, the vinyl functionality is reactive with the monomer. The epoxy functionality is unreactive with the hydroxyl or hydroxyl-reactive functionality of either the monomer or the core molecule under target reaction conditions. In other words, the epoxy functionality remains unreacted in the acrylic polymer and is present to participate in further reactions, which will be described in further detail below.

The acrylic polymer may further include the reaction product of a second compound that is reactive with the monomer and the first compound to form the functionalized intermediate. The second compound may be included to modify a glass transition temperature $T_g$ of the cured film formed from the curable coating composition, which curable coating composition will be described in further detail below. In addition, the second compound may also function to modify the equivalent weight and, therefore, cross-linking density in the cured film. Preferably, the second compound is selected from the group of, but not limited to, acrylates, methacrylates, acrylonitriles, styrenes, alkenes, alkene anhydrides (cyclic or acyclic), and combinations thereof, each of which has vinyl functionality. The second compound may be functionalized or non-functionalized with an additional functionality other than the vinyl functionality. More specifically, the second compound may include additional functionality so long as the additional functionality of the second compound is unreactive with the functionalities of the monomer, the first compound, or the core molecule. Preferably, the second compound is free of functionality other than the vinyl functionality.

In the preferred embodiment, the first compound, and optionally the second compound, is present in a total amount of from 10 to 99, more preferably from 15 to 90, parts by weight based on the total weight of the acrylic polymer.

Preferably, the acrylic polymer has a molecular weight, $M_w$, of 700 to 48,000. For the acrylic polymer having the molecular weight, $M_w$, within the above range, the functionalized intermediate disclosed below preferably has a molecular weight, $M_w$, of approximately 300 to 12,000, more preferably from 1,000 to 4,000. Of course, higher molecular weights, $M_w$, are possible for the functionalized intermediate, but such functionalized intermediates are not ideal for curable coating compositions due to an excessive resultant viscosity in the acrylic composition.

As stated above, the first compound and the monomer react to form the functionalized intermediate. Assuming the monomer is α,α-dimethyl isopropenyl benzyl isocyanate, i.e., the monomer having the hydroxyl-reactive functionality and the vinyl functionality, with the first compound being glycidyl methacrylate, the functionalized intermediate disclosed below is formed, where INIT. represents the initiator and m ranges from 1 to 80, most preferably from 15 to 30.

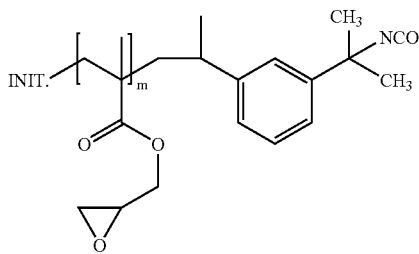

The functionalized intermediate disclosed above is equivalent to functionalized acrylate branches of the acrylic polymer. That is, this functionalized intermediate functions as the branches for subsequent connection, via condensation, to the core of the acrylic polymer. The functionalized acrylate branches are formed first and the core, i.e., the core molecule, is then condensed with the functionalized acrylate branches.

It is to be understood that the above functionalized intermediate is merely one example of many different functionalized intermediates that can be formed during the reaction to form the acrylic composition, and the subject invention is not necessarily limited to this particular functionalized intermediate and subsequent derivatives thereof. For example, when the monomer is di-(1-hydroxycyclohexyl) peroxide, i.e., the monomer having the radical-forming portion and the hydroxyl functionality, and the first compound is glycidyl methacrylate, the functionalized intermediate is formed, where m preferably ranges from 1 to 80, most preferably from 15 to 30. The functionalized intermediate is disclosed below.

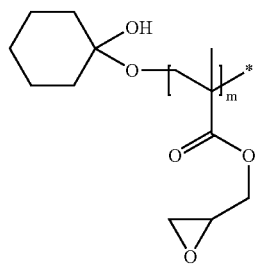

where "*" indicates the free radical. The functionalized intermediate may be terminated, at the free radical, through a number of termination reactions such as through proton extraction from a solvent, reaction with another radicalized compound, decomposition to form a double bond at the free radical site, or any combination of those reactions.

Once the functionalized intermediate is formed, the core molecule is introduced to react with the functionalized intermediate to form the acrylic polymer. The core molecule is selected to provide a functionality that is reactive with the functionality of the monomer that remains unreacted after polymerization with the first compound. As described above, the core molecule is highly branched and is polyfunctional, i.e., has a functionality greater than or equal to 2. For the purposes of this invention, the terminology "highly branched" indicates core molecules that start with a core and branches in at least two, preferably at least three or more, directions. Although extensive branching is not required, it is most preferred that the core molecule, preferably an isocyanate or polyol, is highly branched to achieve desired viscosity benefits.

The core molecules may also be described as branched compounds that have a plurality of functionalities. The functionalities can be primary, secondary, and tertiary functionalities. The core molecule is selected from the group of isocyanates, isocyanurates, melamines, polyols, polycarboxylic acid halides, and combinations thereof, with the core molecule reactive with the functionalized intermediate to form the acrylic polymer. However, other potential core molecules could be different than those mentioned above and could provide a functionality other than those described above. For example, the core molecule may also be a melamine-formaldehyde resin. Preferred core molecules when the functionalized intermediate has the hydroxyl-reactive functionality, i.e., wherein the monomer is the α,α-dimethyl isopropenyl benzyl isocyanate having the aliphatic isocyanato functionality, include polyols that are reactive with the functionalized intermediate to form the acrylic polymer. Preferably, the polyols are selected from the group of glycerol, propylene glycol, erythritol, pentaerythritol, dipentaerythritol, trimethylolethane, trimethylolpropane, dulcitol, threitol, and combinations thereof. For descriptive purposes, a chemical representation of pentaerythritol is disclosed below.

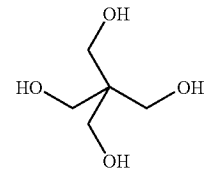

Preferred core molecules for reacting with the functionalized intermediate that has the hydroxyl functionality, i.e. wherein the monomer is the peroxide having the hydroxyl functionality, include isocyanates, isocyanurates, melamines, carboxylic acid halides, and combinations thereof that are reactive with the functionalized intermediate to form the acrylic polymer. Most preferred core molecules for reacting with the functionalized intermediate that has the hydroxyl functionality include isocyanates. Preferably, the isocyanates are selected from the group of trimethylol propane carbamate with tolylene diisocyanate, pentaerythritol carbamate with tolylene diisocyanate, and combinations thereof. Other preferred isocyanates include Desmodur® or Mondur® polyisocyanate commercially available from Mobay Corporation of Pittsburgh, Pa. For descriptive purposes, a chemical representation of pentaerythritol carbamate with tolylene diisocyanate is disclosed below.

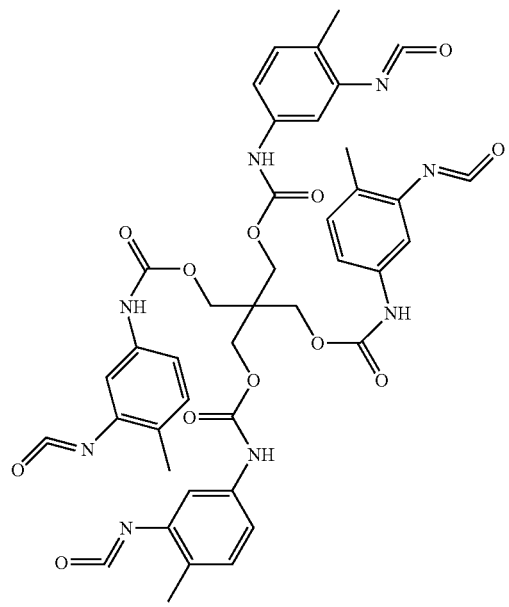

The core molecule is condensed with the functionalized intermediate, i.e., with the functionalized acrylate branches.

More specifically, the core molecule and the functionalized intermediate are reacted to form the acrylic polymer. Success of the condensation of the core molecule and the functionalized intermediate depends on the observation that when the monomer is used to polymerize the first compound, each one of the polymer strands formed will have one and only one functionality originating from the monomer in most cases.

The amount of the core molecule present in the reaction must be balanced with the amount of the functionalized intermediate, i.e., functionalized acrylate branches, that is formed via the reaction of the monomer, the first compound, and, optionally, the second compound. To this end, it is preferred that the molar ratio of the core molecule to the functionalized intermediate is from 1:20 to 1:1, more preferably from 1:10 to 1:3. The core molecule establishes a foundation for the acrylic polymer. Preferably, the core molecule is present in an amount of from 0.1 to 20, more preferably from 0.5 to 10, and most preferably from 0.5 to 1.5, parts by weight based on the total weight of the acrylic polymer.

When the monomer is α,α-dimethyl isopropenyl benzyl isocyanate, the first compound is glycidyl methacrylate, the second compound is not present, and the core molecule is pentaerythritol, the acrylic polymer is disclosed below, where INIT. represents the initiator and m ranges from 1 to 80, most preferably from 15 to 30.

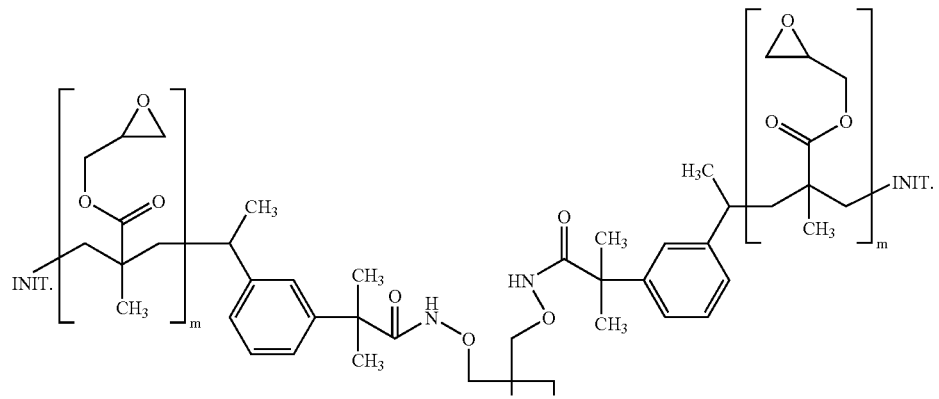

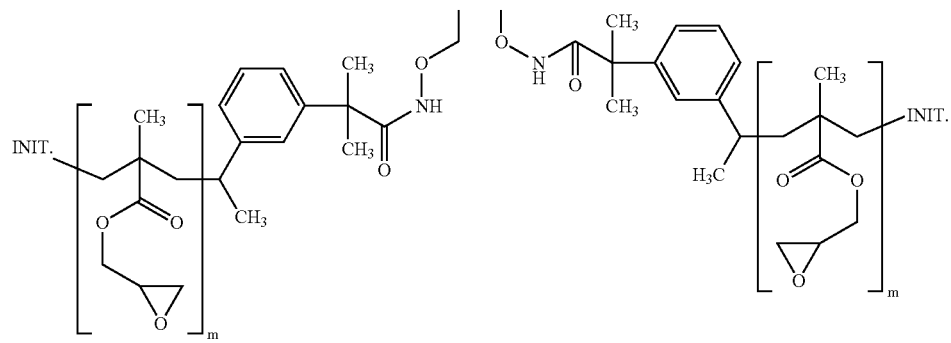

When the monomer is di-(1-hydroxycyclohexyl)peroxide, the first compound is glycidyl methacrylate, and the core molecule is pentaerythritol carbamate with tolylene diisocyanate, the acrylic polymer is disclosed below, where m ranges from 1 to 80, most preferably from 15 to 30, and the "*" indicates the free radical, which may be terminated as described above.

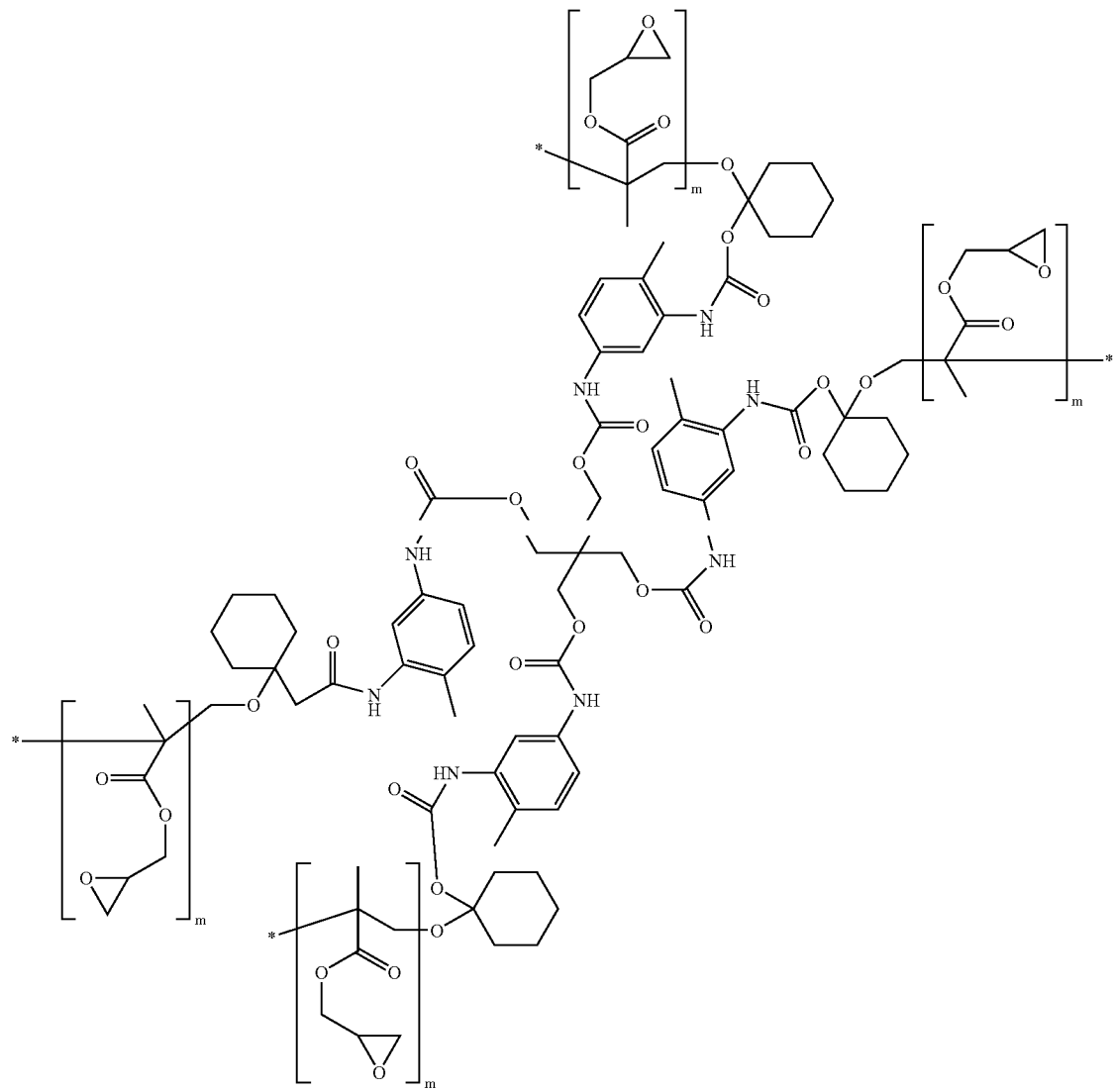

Preferably, the acrylic polymer is present in the acrylic composition in an amount of from 10 to 80 parts by weight based on the total weight of the acrylic composition, more preferably from 30 to 60 parts by weight based on the total weight of the acrylic composition.

As alluded to above, the acrylic composition also includes, in addition to the acrylic polymer, the carboxylic acid compound and/or the alkyl carbamate. In one embodiment, the acrylic polymer, carboxylic acid compound, and alkyl carbamate are reacted as soon as those components are combined. Alternatively, the acrylic polymer, carboxylic acid compound, and alkyl carbamate are combined together and remain unreacted until such time as reaction between the acrylic polymer, carboxylic acid compound, and alkyl carbamate is desired. During the reaction, the acrylic polymer and the carboxylic acid compound react to form a hydroxyl-functional acrylic polymer. The reaction between the acrylic polymer and the carboxylic acid compound may be accomplished by heating the acrylic composition including those components to a temperature of about 130° C.

A transesterification process is used to react the hydroxyl-functional acrylic polymer with the alkyl carbamate. More specifically, the hydroxyl functionality of the hydroxyl-functional acrylic polymer and the alkyl carbamate react to form the acrylic composition including primary carbamate functionality. This reaction is performed at elevated temperatures, preferably in the presence of an organometallic catalyst, and may occur concurrently with the reaction between the acrylic polymer and the carboxylic acid compound, when the acrylic polymer, carboxylic acid compound, and alkyl carbamate are all present together.

In another embodiment, the acrylic polymer and the carboxylic acid compound react to form the hydroxyl-functional acrylic polymer. The alkyl carbamate is subsequently added to and reacted with the hydroxyl-functional acrylic polymer to form the acrylic composition. The organometallic catalyst may also be added prior to or during the addition of the alkyl carbamate to the hydroxyl-functional acrylic polymer. The acrylic composition may be combined with the cross-linking agent that is reactive with the acrylic composition to form the curable coating composition.

As alluded to above, the carboxylic acid compound has carboxylic acid functionality and, preferably, hydroxyl functionality. The carboxylic acid functionality is reactive with the epoxy functionality of the acrylic polymer to form the hydroxyl-functional acrylic polymer. Preferably, when the hydroxyl functionality is present, the carboxylic acid compound is selected from the group of hydroxy acid compounds, dihydroxy acid compounds, trihydroxy acid compounds, and combinations thereof. The amount of hydroxyl functionalities on the carboxylic acid compound contributes to the cross-linking density in the cured film, with more hydroxyl functionalities corresponding to a higher cross-linking density.

The carboxylic acid compound includes at least one carboxylic acid functionality. The carboxylic acid compound may be further defined as an alkanoic acid having from 1 to 30 carbon atoms, such as acetic acid, nanoic acid, etc. Suitable alkanoic acids may be selected from the group of, but not limited to, glycolic acid, 3-hydroxypropionic acid and isomers thereof, 3-hydroxypropionic acid and isomers thereof, 3-hydroxybutyric acid, 3-hydroxyisobutyric acid, dimethylolpropionic acid, lactic acid, 12-hydroxystearic acid, and combinations thereof. For descriptive purposes, a chemical representation of dimethylolpropionic acid, which has one carboxylic acid functionality and two hydroxyl functionalities, is disclosed below.

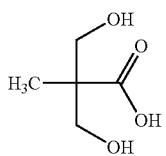

Preferably, the carboxylic acid compound is present in the acrylic composition in an amount from 1 to 30, more preferably from 5 to 20, parts by weight based on the total weight of the acrylic composition. For descriptive purposes, a chemical representation of a portion of the hydroxyl-functional acrylic polymer formed by the reaction of one mole of dimethylpropionic acid and one mole of the acrylic polymer is disclosed below.

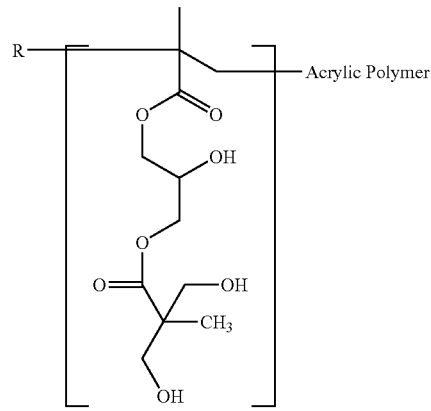

wherein the "Acrylic Polymer" label corresponds to the structure of either of the acrylic polymers graphically represented above, R corresponds to either the initiator or the free radical, depending on the monomer that is used, and m is from 1 to 80, most preferably from 15 to 30. As illustrated, the carboxylic acid functionality of the carboxylic acid compound and the epoxy functionality of the acrylic polymer have reacted through a ring-opening reaction, which results in the formation of the hydroxyl functionality and the attachment of the carboxylic acid compound to the acrylic polymer. The above chemical representation is not limited to either of the two specific embodiments of the acrylic polymer as described above.

The alkyl carbamate is reactive with the hydroxyl-functional acrylic polymer, more specifically the hydroxyl functionality of the hydroxyl-functional acrylic polymer, to form the acrylic composition, which has carbamate functionality. Preferably, the alkyl carbamate has from 1 to 20 carbon atoms in the alkyl chain, and is generically defined as

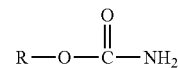

where R is the alkyl chain having from 1 to 20 carbon atoms. Preferably, the alkyl carbamate is selected from the group of, but not limited to, methyl carbamate, ethyl carbamate, propyl carbamate, butyl carbamate, propylene glycol monocarbamate, and combinations thereof. The most preferred alkyl carbamate compound comprises methyl carbamate. Preferably, the alkyl carbamate is present in the acrylic composition in an amount from 5 to 30, preferably from 15 to 25, parts by weight based on 100 parts by weight of the acrylic composition. Also, the preferred ratio of effective equivalents of the carboxylic acid compound to the alkyl carbamate compound is from 1:1 to 1:10.

The amount of the alkyl carbamate used in the acrylic composition is dependent upon the number of hydroxyl functionalities on the hydroxyl-functional acrylic polymer. The total number of moles of the carbamate compound is generally equal to the number of hydroxyl functionalities on the hydroxyl-functional acrylic polymer, which preferably results in consumption of all hydroxyl functionality on the hydroxyl-functional acrylic polymer. Therefore, in the preferred embodiment, the molar ratio of the carbamate compound, e.g., methyl carbamate, to the carboxylic acid compound, e.g., dimethylolpropionic acid, is 3:1 because, after reaction of one mole of the dimethylolpropionic acid with the epoxy functionality of the acrylic polymer, three moles of hydroxyl functionality are present in the acrylic composition. If the carboxylic acid compound is lactic acid, which has one hydroxyl functionality and one carboxylic acid functionality, then preferably two moles of the carbamate compound are utilized for each mole of the lactic acid to prepare the acrylic composition, since two moles of hydroxyl functionality are present in the acrylic composition after the lactic acid and the acrylic polymer react.

Of course, acrylic compositions formed from lower equivalents of the alkyl carbamate are not to be excluded. For instance, as a non-limiting example, if three moles of hydroxyl functionality are present, and only two moles of the alkyl carbamate compound are utilized, then the acrylic composition will have both carbamate and hydroxyl functionality. When the carbamate and the hydroxyl functionality are both present, the amount of the cross-linking agent may be limited, as described in further detail below, to prevent cross-linking with the hydroxyl functionality. For descriptive purposes, a chemical representation of the acrylic composition formed by the reaction of the methyl carbamate and the acrylic polymer, with a 3:1 ratio of alkyl carbamate to the dimethylolpropionic acid, is disclosed below.

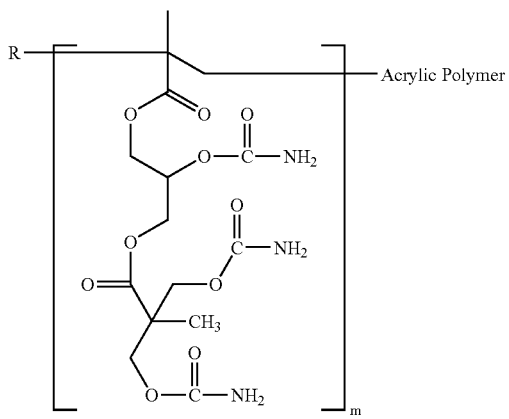

The above chemical representation is valid for either of the two preferred embodiments of the acrylic polymer as described above, wherein the "Acrylic Polymer" label corresponds to the structure of the respective embodiment of the acrylic polymer, R corresponds to either the initiator or the free radical, depending on the monomer that is used, and m is from 1 to 80, most preferably from 15 to 30. The chemical representation of the acrylic composition that is disclosed above is merely illustrative of the subject invention. The acrylic composition disclosed above has three carbamate functionalities that are derived from the structures of the carboxylic acid compound and the alkyl carbamate, in the preferred embodiment dimethylolpropionic acid and methyl carbamate, respectively. It is to be understood that if alternative compounds are selected for the carboxylic acid compound and the alkyl carbamate, then the acrylic composition may be different than that which is disclosed above, and may have more or less carbamate functionalities.

As alluded to above, the curable coating composition that includes the acrylic composition also includes the cross-linking agent that is reactive with the carbamate functionality and, optionally, the hydroxyl functionality of the acrylic composition. Suitable cross-linking agents are selected from the group of, but are not limited to, polyisocyanates, polyisocyanurates, melamine-formaldehyde resins, polycarboxylic acid halides, and combinations thereof.

Also suitable for the cross-linking agent are aminoplast resins that are reactive with the carbamate functionality. As understood by those skilled in the art, an aminoplast resin is formed by the reaction product of a formaldehyde and an amine where the preferred amine is a urea or a melamine. In other words, the aminoplast resin may include urea resins and melamine-formaldehyde resins.

The melamine-formaldehyde resins of the preferred embodiment include either methylol functionality, alkoxymethyl functionality, or both. The alkoxymethyl functionality is of the general formula —$CH_2OR_1$, where $R_1$ is an alkyl chain having from 1 to 20 carbon atoms. As understood by those skilled in the art, the methylol functionality and the alkoxymethyl functionality are reactive with the carbamate functionality of the acrylic composition. The methylol and alkoxymethyl functionalities are preferentially reactive with the carbamate functionality, as opposed to any hydroxyl functionality, to 'cross-link' the curable coating composition upon cure. Examples of suitable aminoplast resins include, but are not limited to, monomeric or polymeric melamine-formaldehyde resins, including melamine resins that are partially or fully alkylated using alcohols that preferably have one to six, more preferably one to four, carbon atoms, such as hexamethoxy methylated melamine; urea formaldehyde resins including methylol ureas and siloxy ureas such as butylated urea formaldehyde resin, alkylated benzoguanimines, guanyl ureas, guanidines, biguanidines, polyguanidines, and the like. Although urea and melamine are the preferred amines, other amines such as triazines, triazoles, diazines, guanidines, or guanamines may also be used to prepare the aminoplast resins. Furthermore, although formaldehyde is preferred for forming the aminoplast resin, other aldehydes, such as acetaldehyde, crotonaldehyde, and benzaldehyde, may also be used.

Monomeric melamine-formaldehyde resins are particularly preferred. The preferred melamine-formaldehyde resin includes hexamethoxymethyl melamine (HMMM). HMMM is commercially available from Solutia under its Resimene Amino Crosslinker Resins. HMMM is shown in the following chemical representation.

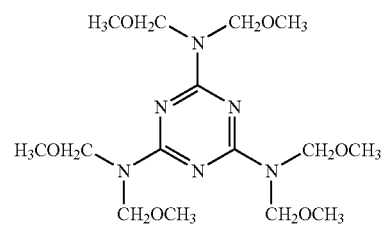

Upon addition of the cross-linking agent to the acrylic composition, the alkoxymethyl functionality of the HMMM, specifically the $CH_2OCH_3$ group, and the carbamate functionality of the acrylic polymer react to establish urethane (—NH—CO—O—) linkages. The urethane linkage between the acrylic composition and the cross-linking agent is from the carbamate-melamine reaction and is ideal for resistance to environmental acid etch.

Because the acrylic composition of the present invention has terminal carbamate functionality and because the aminoplast is reactive with the carbamate functionality, ether linkages which result from a hydroxyl functionality-aminoplast cure, and which are particularly susceptible to acid etch, can be avoided as the primary cross-linking mechanism. To accomplish this, the amount of the cross-linking agent, for example, the aminoplast resin, may be limited so that the cross-linking agent reacts only with the available carbamate functionality in the acrylic composition. That is, in the preferred embodiment, the aminoplast cross-linking agent reacts preferably with available carbamate functionality before any substantial reaction with the hydroxyl functionality that is present in the acrylic composition. It is therefore possible to control the amount of ether linkages that are formed when cross-linking the acrylic composition and the cross-linking agent. The amount of cross-linking agent can be increased if cross-linking with the hydroxyl functionality is desired.

Although not necessarily preferred, an alternative cross-linking agent for use in the subject invention is the polyisocyanate cross-linking agent. The most preferred polyisocyanate cross-linking agent is a triisocyanurate. The polyisocyanate cross-linking agent can be an aliphatic polyisocyanate, including a cycloaliphatic polyisocyanate, or an aromatic polyisocyanate. The term "polyisocyanate" as used herein refers to any compound having a plurality of isocyanato functionalities on average per molecule. Polyisocyanates encompass, for example, monomeric polyisocyanates including monomeric diisocyanates, biurets and isocyanurates of monomeric polyisocyanates, extended poly-functional isocyanates formed by reacting one mole of a diol with two moles of a diisocyanate or mole of a triol with three moles of a diisocyanate, and the like. Useful examples of suitable polyisocyanates cross-linking agents include, without limitation, ethylene diisocyanate, 1,2-diisocyanatopropane, 1,3-diisocyanatopropane, 1,4-butylene diisocyanate, lysine diisocyanate, 1,4-methylene bis(cyclohexyl isocyanate), isophorone diisocyanate, toluene diisocyanate, the isocyanurate of toluene diisocyanate, diphenylmethane 4,4'-diisocyanate, the isocyanurate of diphenylmethane 4,4'-diisocyanate, methylenebis-4,4'-isocyanatocyclohexane, isophorone diisocyanate, the isocyanurate of isophorone diisocyanate, 1,6-hexamethylene diisocyanate, the isocyanurate of 1,6-hexamethylene diisocyanate, 1,4-cyclohexane diisocyanate, p-phenylene diisocyanate, triphenylmethane 4,4',4"-triisocyanate, tetramethyl xylene diisocyanate, met-axylene diisocyanate, and combinations thereof. Aliphatic polyisocyanates are preferred when the curable coating composition is used as an automotive topcoat composition.

Generally, the acrylic composition is present in an amount from 65 to 90, preferably from 75 to 90, parts by weight based on the total weight of the curable coating composition, and the cross-linking agent is present in an amount from 1 to 35, preferably from 5 to 25, and most preferably from 7 to 15, parts by weight based on 100 parts by weight of the curable coating composition. The ratio of effective equivalents of the acrylic composition to the cross-linking agent is from 3:1 to 1:3.

The curable coating composition may also include one additive or a combination of additives. Such additives include, but are not limited to, solvents, catalysts, hindered amine light stabilizers (HALs), ultra-violet absorbers (UVAs), rheology control agents, anti-yellowing agents, adhesion promoting agents, and the like. Specific examples of some of the above additives include n-methylpyrrolidone and oxo-hexyl acetate as solvents to affect such characteristics as pop and sag resistance, and polybutyl acrylate, fumed silica, and silicone as rheology control agents.

The following examples illustrating the formation of and the use of the acrylic composition of the present invention, as presented herein, are intended to illustrate and not limit the invention.

EXAMPLES

In the Examples, Acrylic Polymer A was prepared by adding and reacting the following components, in parts by weight based on the total weight of the acrylic composition, unless otherwise indicated.

TABLE 1

| Reactant | |
|---|---|
| FUNCTIONALIZED MONOMER | 4.90 |
| α,α-dimethyl isopropenyl benzyl isocyanate | |
| FIRST COMPOUND | 19.62 |
| glycidyl methacrylate | |
| SECOND COMPOUND A | 49.05 |
| methyl methacrylate | |
| SECOND COMPOUND B | 24.52 |
| n-butyl acrylate | |
| INITIATOR | 0.98 |
| tert-butylperoxy-2-ethylhexanoate (TBPO) | |
| CORE MOLECULE A | 0.93 |
| pentaerythritol | |
| TOTAL | 100.0 |
| NCO of Functionalized Intermediate, % | 1.25 |
| Number Average Molecular Weight ($M_n$) of Functionalized Intermediate, g/mol | 1970 |
| Weight Average Molecular Weight ($M_w$) of Functionalized Intermediate, g/mol | 3370 |
| Polydispersity Index of Functionalized Intermediate | 1.7 |
| Number Average Molecular Weight ($M_n$) of Acrylic Polymer A, g/mol | 2370 |
| Weight Average Molecular Weight ($M_n$) of Acrylic Polymer A, g/mol | 5580 |
| Polydispersity Index of Acrylic Polymer A | 2.4 |

To form Acrylic Polymer A, 75.0 grams of Solvesso® 100 aromatic hydrocarbon solvent (also referred to as Aromatic 100) were added into a reactor, and the reactor was heated via a conventional heat supply to a temperature of 150° C. Once the reactor reached 150° C., a mixture of the Functionalized Monomer, First Compound, Second Compound A, Second Compound B, and the Initiator were added to the reactor over approximately 3 hours to form the functionalized intermediate.

Once the functionalized intermediate was formed, the temperature was lowered until the temperature of the functionalized intermediate reached approximately 100-110° C. Then, the Core Molecule A was added to the reactor along with an additional 11 grams of Solvesso® 100 aromatic hydrocarbon solvent. A drop of dibutyltin dilaurate (DBTDL) catalyst was added. The reaction was maintained at 100° C. until % NCO measured to be less than 0.1 meq on solids.

Acrylic Polymer B will be prepared by adding and reacting the following components, in parts by weight based on the total weight of the acrylic composition, unless otherwise indicated.

TABLE 2

| Reactant | |
|---|---|
| FUNCTIONALIZED MONOMER B | 9.17 |
| di-(1-hydroxycyclohexyl) peroxide | |
| FIRST COMPOUND | 27.51 |
| glycidyl methacrylate | |
| SECOND COMPOUND C | 18.34 |
| Styrene | |
| SECOND COMPOUND D | 36.68 |
| Cyclohexyl methacrylate | |

TABLE 2-continued

| Reactant | |
|---|---|
| CORE MOLECULE B pentaerythritol carbamate with tolylene diisocyanate | 8.30 |
| TOTAL | 100.0 |
| Theoretical OH, % | 0.38 |
| Theoretical Number Average Molecular Weight ($M_n$) of Functionalized Intermediate, g/mol | 2800 |
| Theoretical Weight Average Molecular Weight ($M_w$) of Functionalized Intermediate, g/mol | 4950 |
| Theoretical Polydispersity Index of Functionalized Intermediate | 1.8 |
| Theoretical Number Average Molecular Weight ($M_n$) of Acrylic Polymer B, g/mol | 2370 |
| Theoretical Weight Average Molecular Weight ($M_w$) of Acrylic Polymer B, g/mol | 7180 |
| Theoretical Polydispersity Index of Acrylic Polymer B | 3.0 |

To form the acrylic polymer, 75.0 grams of Solvesso® 100 aromatic hydrocarbon solvent (also referred to as Aromatic 100) would be added into a reactor, and the reactor would be heated via a conventional heat supply to a temperature of 121° C. Once the reactor reached 121° C., a mixture of the Functionalized Monomer, First Compound, Second Compound A, and Second Compound B according to Table 2 would be added to the reactor over approximately 3 hours to form the functionalized intermediate.

Once the functionalized intermediate is formed, the temperature will be lowered until the temperature of the functionalized intermediate reaches approximately 100-110° C. Then, the Core Molecule will be added to the reactor along with an additional 11 grams of Solvesso® 100 aromatic hydrocarbon solvent. A drop of DBTDL catalyst will also be added and the reaction will be maintained at 100° C. until % NCO measures to be less than 0.02 meq on solids.

Acrylic Composition A is prepared, and Acrylic Composition B would be prepared, by adding and reacting the following components, in parts by weight based on the total weight of the acrylic composition, unless otherwise indicated.

TABLE 1

| Reactant | Acrylic Composition A Weight, % | Acrylic Composition B Weight, % |
|---|---|---|
| CARBOXYLIC ACID COMPOUND dimethylolpropionic acid [DMPA] | 11.94 | 10.30 |
| ALKYL CARBAMATE methyl carbamate | 22.38 | 19.50 |
| ORGANOMETALLIC CATALYST, dibutyltin oxide | 0.03 | 0.1 |
| ACRYLIC POLYMER A α,α-dimethyl isopropenyl benzyl isocyanate + glycidyl methacrylate + pentaerythritol | 65.65 | None |
| ACRYLIC POLYMER B di-(1-hydroxycyclohexyl) peroxide + glycidyl methacrylate + pentaerythritol carbamate with tolylene diisocyanate | None | 70.10 |
| TOTAL | 100.0 | 100.0 |
| toluene solvent, g | 30 | 30 |
| amyl acetate solvent, g | 100 | 100 |

Per the above Table 3, 40 grams of DMPA and 220 grams of Acrylic Polymer A were reacted at 110° C. in a reaction flask until more than 90% of the epoxide of the Acrylic Polymer A has reacted. Alternatively, 272 grams of Acrylic Polymer B may be substituted for Acrylic Polymer A and reacted in the same manner as above. After IR Spectroscopy verification to confirm that most (>90%) of the DMPA has reacted, 30 grams of toluene, 75 grams of methyl carbamate, and 0.1 grams of dibutyltin oxide were charged in the reaction flask. The reaction flask, including the reaction product of the DMPA and Acrylic Polymer A, along with the methyl carbamate, dibutyltin oxide, and toluene, is heated with a conventional heat supply to a temperature of from 120 to 135° C. to form the Acrylic Composition A having carbamate functionality. Methanol side product, resulting from the production of the Acrylic Composition A, is removed during the reaction. The extent of the reaction is monitored by titrating for the presence of hydroxyl functionality. When more than 90% of the hydroxyl functionalities were converted into carbamate functionalities, vacuum was applied to the reaction flask to remove any methyl carbamate that remained unreacted until less than 0.2 parts by weight of the methyl carbamate, based on the total solids in the reaction flask, are present. The reaction mixture was cooled to approximately 60 to 70° C., and 100 grams of amyl acetate were added to fully disperse the Acrylic Composition A. The total reaction time for the Acrylic Polymer A to react with the DMPA, and then subsequent reaction with the methyl carbamate, is about 30 hours. The Acrylic Composition A has a non-volatile % of about 70 parts by weight based on the total weight of the Acrylic Composition A.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. An acrylic composition comprising the reaction product of:
   A) an acrylic polymer comprising the reaction product of;
      i) a functionalized monomer;
      ii) a first compound reactive with said functionalized monomer to form a functionalized intermediate, said first compound comprising vinyl functionality reactive with said functionalized monomer and epoxy functionality; and
      iii) a highly branched, polyfunctional core molecule reactive with said functionalized intermediate to form said acrylic polymer;
   B) a carboxylic acid compound comprising carboxylic acid functionality that is reactive with said epoxy functionality of said acrylic polymer to form a hydroxyl-functional acrylic polymer; and
   C) an alkyl carbamate that is reactive with said hydroxyl-functional acrylic polymer to form said acrylic composition.

2. An acrylic composition as set forth in claim 1 wherein said carboxylic acid compound further comprises hydroxyl functionality.

3. An acrylic composition as set forth in claim 1 wherein said carboxylic acid compound has at least one carboxylic acid functionality.

4. An acrylic composition as set forth in claim 3 wherein said carboxylic acid compound is further defined as an alkanoic acid having from 1 to 30 carbon atoms.

5. An acrylic composition as set forth in claim 1 wherein the ratio of effective equivalents of said carboxylic acid compound to said alkyl carbamate is from 1:1 to 1:10.

6. An acrylic composition as set forth in claim 1 further comprising an organometallic catalyst for catalyzing the reaction between said alkyl carbamate and said hydroxyl-functional acrylic polymer.

7. An acrylic composition as set forth in claim 1 wherein said functionalized monomer comprises hydroxyl-reactive functionality and vinyl functionality.

8. An acrylic composition as set forth in claim 7 wherein said hydroxyl-reactive functionality comprises aliphatic isocyanato functionality.

9. An acrylic composition as set forth in claim 7 wherein said first compound is selected from the group of glycidyl acrylate, glycidyl alkacrylates, and combinations thereof.

10. An acrylic composition as set forth in claim 7 wherein said core molecule comprises a polyol reactive with said functionalized intermediate to form said acrylic polymer.

11. An acrylic composition as set forth in claim 10 wherein said polyol is selected from the group of glycerol, propylene glycol, erythritol, pentaerythritol, dipentaerythritol, trimethylolethane, trimethylolpropane, dulcitol, threitol, and combinations thereof.

12. An acrylic composition as set forth in claim 7 wherein said acrylic polymer further comprises the reaction product of an initiator selected from the group of inorganic persulfates, dialkyl peroxides, hydroperoxides, peresters, azo compounds, and combinations thereof.

13. An acrylic composition as set forth in claim 1 wherein said functionalized monomer comprises hydroxyl functionality and vinyl functionality.

14. An acrylic composition as set forth in claim 13 wherein said core molecule is selected from the group of isocyanates, isocyanurates, melamines, carboxylic acid halides, and combinations thereof with said core molecule reactive with said functionalized intermediate to form said acrylic polymer.

15. An acrylic composition as set forth in claim 1 wherein said functionalized monomer comprises a radical-forming portion and hydroxyl functionality.

16. An acrylic composition as set forth in claim 15 wherein said first compound is selected from the group of glycidyl acrylate, glycidyl alkacrylates, and combinations thereof.

17. An acrylic composition as set forth in claim 15 wherein said core molecule is selected from the group of isocyanates, isocyanurates, melamines, carboxylic acid halides, and combinations thereof with said core molecule reactive with said functionalized intermediate to form said acrylic polymer.

18. An acrylic composition as set forth in claim 1 wherein said functionalized monomer comprises a radical-forming portion and hydroxyl-reactive functionality.

19. An acrylic composition as set forth in claim 18 wherein said first compound is selected from the group of glycidyl acrylate, glycidyl alkacrylates, and combinations thereof.

20. An acrylic composition as set forth in claim 18 wherein said core molecule comprises a polyol reactive with said functionalized intermediate to form said acrylic polymer.

21. An acrylic composition as set forth in claim 1 wherein said acrylic polymer further comprises the reaction product of a second compound comprising vinyl functionality and reactive with said functionalized monomer and said first compound to form said functionalized intermediate.

22. An acrylic composition as set forth in claim 21 wherein said second compound is selected from the group of acrylates, methacrylates, acrylonitriles, styrenes, and combinations thereof.

23. An acrylic composition comprising:
  A) an acrylic polymer comprising the reaction product of:
    i) a functionalized monomer;
    ii) a first compound reactive with said functionalized monomer to form a functionalized intermediate, said first compound comprising vinyl functionality reactive with said functionalized monomer and epoxy functionality; and
    iii) a highly branched, polyfunctional core molecule reactive with said functionalized intermediate to form said acrylic polymer; and
  B) a carboxylic acid compound comprising carboxylic acid functionality that is reactive with said epoxy functionality of said acrylic polymer.

24. An acrylic composition as set forth in claim 23 further comprising an alkyl carbamate.

25. An acrylic composition as set forth in claim 24 further comprising an organometallic catalyst.

26. An acrylic composition as set forth in claim 25 wherein said functionalized monomer comprises $\alpha,\alpha$-dimethyl isopropenyl benzyl isocyanate, said first compound comprises glycidyl acrylate or glycidyl methacrylate, said core molecule comprises pentaerythritol, said carboxylic acid compound comprises dimethylolpropionic acid, said alkyl carbamate comprises methyl carbamate, and said organometallic catalyst comprises dibutyltin oxide.

27. An acrylic composition as set forth in claim 25 wherein said functionalized monomer comprises $\alpha,\alpha$-dimethyl isopropenyl benzyl isocyanate, said first compound comprises glycidyl acrylate or glycidyl methacrylate, said core molecule comprises pentaerythritol, said carboxylic acid compound comprises dimethylolpropionic acid, said alkyl carbamate comprises methyl carbamate, and said organometallic catalyst comprises dibutyltin oxide.

28. An acrylic composition comprising:
  A) an acrylic polymer comprising the reaction product of:
    i) a functionalized monomer;
    ii) a first compound reactive with said functionalized monomer to form a functionalized intermediate, said first compound comprising vinyl functionality reactive with said functionalized monomer and epoxy functionality; and
    iii) a highly branched, polyfunctional core molecule reactive with said functionalized intermediate to form said acrylic polymer; and
  B) an alkyl carbamate.

* * * * *